US006220843B1

(12) United States Patent
Allen

(10) Patent No.: US 6,220,843 B1

(45) Date of Patent: Apr. 24, 2001

(54) SEGMENTED DIE FOR APPLYING HOT MELT ADHESIVES OR OTHER POLYMER MELTS

(75) Inventor: Martin A. Allen, Dawsonville, GA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 09/138,039

(22) Filed: Aug. 20, 1998

Related U.S. Application Data

(60) Provisional application No. 60/077,780, filed on Mar. 13, 1998.

(51) Int. Cl.[7] ............................ B29C 47/10; B29C 47/12

(52) U.S. Cl. ........................... 425/7; 425/72.2; 425/192 S

(58) Field of Search ............................. 425/72.2, 7, 83.1, 425/81.1, 186, 192 S; 118/315; 156/167

(56) References Cited

U.S. PATENT DOCUMENTS

| | | | |
|---|---|---|---|
| 3,849,241 | 11/1974 | Butin et al. . | |
| 4,073,850 | 2/1978 | Brackman et al. . | |
| 4,478,624 | 10/1984 | Battigelli et al. . | |
| 4,526,733 | 7/1985 | Lau | 264/12 |
| 4,687,137 | 8/1987 | Boger et al. . | |
| 4,708,619 | 11/1987 | Balk | 425/141 |
| 4,785,996 | 11/1988 | Ziecker et al. . | |
| 4,815,660 | 3/1989 | Boger . | |
| 4,891,249 | 1/1990 | McIntyre . | |
| 4,983,109 | 1/1991 | Miller et al. | 425/7 |
| 5,145,689 | 9/1992 | Allen et al. | 425/72.2 |
| 5,236,641 | 8/1993 | Allen et al. | 264/40.1 |
| 5,269,670 * | 12/1993 | Allen et al. | 425/72.2 |
| 5,368,233 | 11/1994 | Brusko . | |
| 5,382,312 | 1/1995 | Raterman . | |
| 5,445,674 * | 8/1995 | DeMars | 118/315 |
| 5,605,720 | 2/1997 | Allen et al. . | |
| 5,618,566 | 4/1997 | Allen et al. | 425/7 |
| 5,679,379 | 10/1997 | Fabbricante et al. | 425/7 |
| 5,728,219 * | 3/1998 | Allen et al. | 425/72.2 |

FOREIGN PATENT DOCUMENTS

| | | |
|---|---|---|
| 85 34 594 U | 12/1985 | (DE) . |
| 0701010 A1 | 3/1996 | (EP) . |
| WO 94/01221 | 1/1994 | (WO) . |

OTHER PUBLICATIONS

Trends (1993) The CF 800 Metered Head.

* cited by examiner

*Primary Examiner*—Harold Pyon
*Assistant Examiner*—Joseph Leyson
(74) *Attorney, Agent, or Firm*—Wood, Herron & Evans, L.L.P.

(57) ABSTRACT

A segmented die assembly comprises a plurality of side-by-side and separate units. Each die unit, includes a manifold segment and a die module mounted thereon. The manifold segments are interconnected and function to deliver process air and polymer melt to the modules. Each module including a nozzle through which the polymer melt is extruded forming a row of filament(s). The filaments from the array of modules are deposited on a substrate or collector. The die assembly is preferably used to apply a hot melt adhesive to a substrate, but also may be used to produce meltblown webs.

13 Claims, 7 Drawing Sheets

SEGMENTED DIE FOR APPLYING HOT MELT ADHESIVES OR OTHER POLYMER MELTS

RELATED APPLICATIONS

This application claims the benefit of U.S. Provisional Application Ser. No. 60/077,780, filed Mar. 13, 1998.

BACKGROUND OF THE INVENTION

This invention relates generally to dies for applying hot melt adhesives to a substrate or producing nonwovens. In one aspect the invention relates to a modular die provided with at least one air-assisted die tip or nozzle. In another aspect, the invention relates to a segmented die assembly comprising a plurality of separate die units, each unit including a manifold segment and a die module mounted thereon.

The deposition of hot melt adhesives onto substrates has been used in a variety of applications including diapers, sanitary napkins, surgical drapes, and the like. This technology has evolved from the application of linear beads such as that disclosed in U.S. Pat. No. 4,687,137, to air-assisted deposition such as that disclosed in U.S. Pat. No. 4,891,249, to spiral deposition such as that disclosed in U.S. Pat. Nos. 4,949,668 and 4,983,109. More recently, meltblowing dies have been adapted for the application of hot melt adhesives (see U.S. Pat. No. 5,145,689).

Modular dies have been developed to provide the user with flexibility in selecting the effective length of the die. For short die lengths only a few modules need be mounted on a manifold block. (See U.S. Pat. No. 5,618,566). Longer dies can be achieved by adding more modules to the manifold. U.S. Pat. No. 5,728,219 teaches that the modules may be provided with different types of die tips or nozzles to permit the selection of not only the die length but also the deposition pattern.

At the present, the most commonly used adhesive applicators are intermittently operated air-assisted dies. These include meltblowing dies, spiral nozzles, and spray nozzles.

Meltblowing is a process in which high velocity hot air (normally referred to as "primary air") is used to blow molten filaments extruded from a die onto a collector to form a nonwoven web or onto a substrate to form an adhesive pattern, a coating, or composite. The process employs a die provided with (a) a plurality of openings (e.g. orifices) formed in the apex of a triangular shaped die tip and (b) flanking air plates which define converging air passages. As extruded rows of the polymer melt emerge from the openings as filaments, the converging high velocity hot air from the air passages contacts the filaments and by drag forces stretches and draws them down forming microsized filaments. In some meltblowing dies, the openings are in the form of slots. In either design, the die tips are adapted to form a row of filaments which upon contact with the converging sheets of hot air are carried to and deposited on a collector or a substrate in a random pattern.

Meltblowing technology was originally developed for producing nonwoven fabrics but recently has been utilized in the meltblowing of adhesives onto substrates.

The filaments extruded from the air-assisted die may be continuous or discontinuous. For the purpose of the present invention the term "filament" is used interchangeably with the term "fiber" and refers to both continuous and discontinuous strands.

Another popular die head is a spiral spray nozzle. Spiral spray nozzles, such as those described in U.S. Pat. Nos. 4,949,668 and 5,102,484, operate on the principle of a thermoplastic adhesive filament being extruded through a nozzle while a plurality of hot air jets are angularly directed onto the extruded filament to impart a circular or spiral motion thereto. The filaments thus assume an expanding swirling cone shape pattern while moving from the extrusion nozzle to the substrate. As the substrate is moved in the machine direction with respect to the nozzle, a circular or spiral or helical bead is continuously deposited on the substrate, each circular cycle being displaced from the previous cycle by a small amount in the direction of substrate movement. The meltblowing die tips offer superior coverage whereas the spiral nozzles provide better edge control.

Other adhesive applications include the older non-air assisted bead nozzles such as bead nozzles and coating nozzles.

SUMMARY OF THE INVENTION

The segmented die assembly of the present invention is of modular construction, comprising a plurality of side-by-side and interconnected die units. Each die unit includes a manifold segment and a die module mounted on the manifold segment. The die module has mounted thereon an air-assisted die tip or nozzle. The die tip may be a meltblowing type and the nozzle may be a spiral nozzle or a spray nozzle. For convenience of description, the term "nozzle" is used herein in the generic sense, meaning any air-assisted die tip or nozzle; and the term "air-assisted" means a nozzle through which is extruded a molten thermoplastic filament or filaments, and air jets, air streams, or air sheets which contact the molten filaments to divert, attenuate or change the flow pattern of the filament(s) and impart a desired characteristic to the filaments, either in terms of the size of the filaments or the deposition pattern.

The main components of each die unit, the manifold segment and the module, are provided with (a) air passages for delivering air to the nozzles and (b) a polymer flow passage for delivering a polymer melt to the nozzle. In the preferred embodiment, the nozzle is a meltblowing die tip provided with a row of orifices and flanking air slits, so that as a row of filaments are extruded through the meltblowing die tip, they are contacted with converging sheets of hot air that attenuate or draw down the filaments to microsize. As described in detail below, the nozzle may also be a spiral or spray nozzle. In practice, the die assembly may include segmented units having different types of nozzles.

The segmented die units are assembled by interconnecting several identical manifold segments, wherein the air passages and the polymer flow passage of each segment are in fluid communication. In the assembled condition, the interconnected manifold segments function much in the manner of an integrated manifold. A die module is mounted on each manifold segment and, in combination with other die modules, form a row thereon. Thus, polymer melt is extruded as a row of filaments from the array of modules and deposited on a moving substrate positioned under the assembly.

In a preferred embodiment, each module is provided with an air-actuated valve to selectively open and close the polymer flow passage. The instrument air for activating the valve is delivered through each manifold segment to the module. The valves may be individually actuated or actuated as a bank, depending on the instrument air passages and the number of control valves used.

The segmented die assembly of the present invention offers several advantages over the prior art:

(a) Die modules may be replaced by merely removing an existing module from an assembled manifold segment, and replacing it with a new module. This feature not only permits the replacement of faulty modules, but also permits changing the die nozzle.

(b) The length of the die assembly determines the effective length of the die discharge (i.e. length of the row of nozzles). In prior art designs, the die length was determined by the manifold length which had to be preformed. For example, a manifold would be built to accommodate a maximum number of modules. Frequently, however, less than the maximum number would be required. This meant that several manifold sites (i.e. those without modules) would have to be sealed off. In the present invention, the manifold is made up of only the active manifold segments (i.e. those which have modules mounted thereon).

(c ) The manifold segments are substantially identical and interchangeable, and are simple in construction. The machining of the small segments is much easier than that required for bulky integrated manifolds.

(d) If a manifold segment becomes plugged or damaged, it can easily be replaced by a new manifold segment. In the prior art device, the entire manifold would have to be replaced.

(e) The solid block manifold of the prior art, in some operations, may include dormant polymer flow passages, as in situations where the active die length is substantially less than the length of the manifold. These dormant passages at the end of the manifold could become partially or completely plugged.

These and other advantages of the die assembly of the present invention will be apparent to those skilled in the art.

DESCRIPTION OF THE PREFERRED EMBODIMENTS

Figure 1:
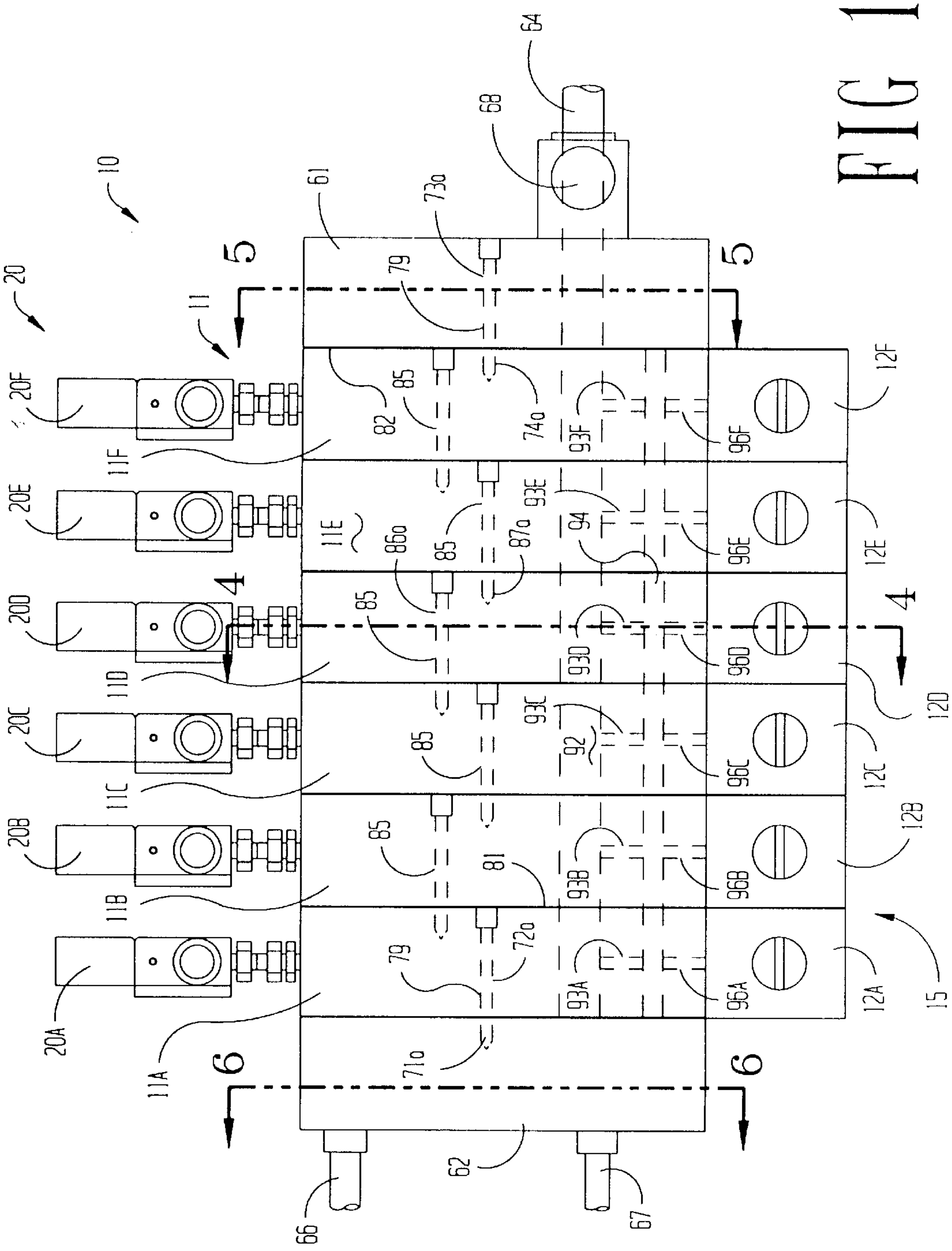
FIG. 1 is a top plan view of a segmented meltblowing die constructed according to the present invention showing polymer flow lines.
Figure 2:
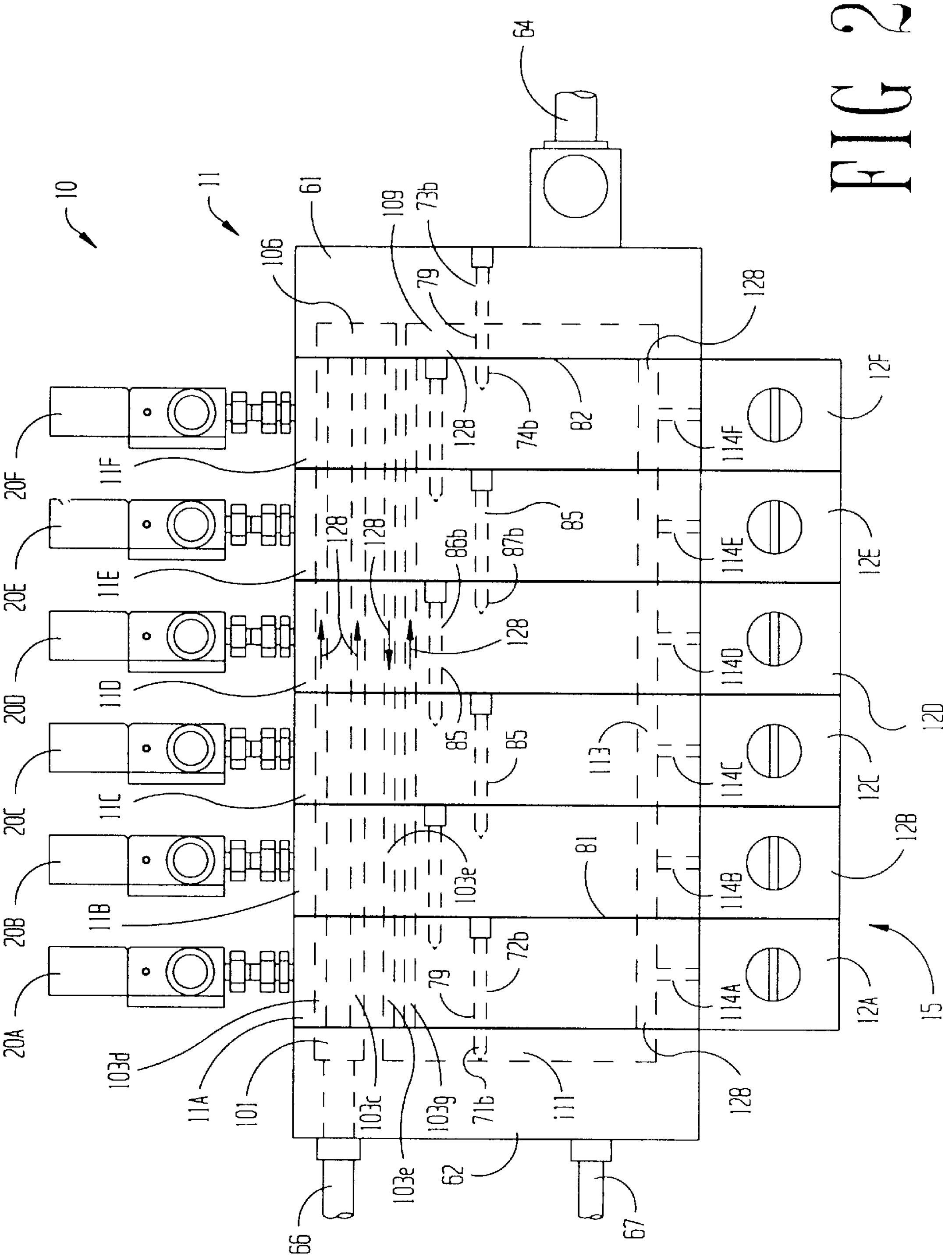
FIG. 2 is a top plan view of the present segmented die showing process air (primary air) flow lines.
Figure 3:
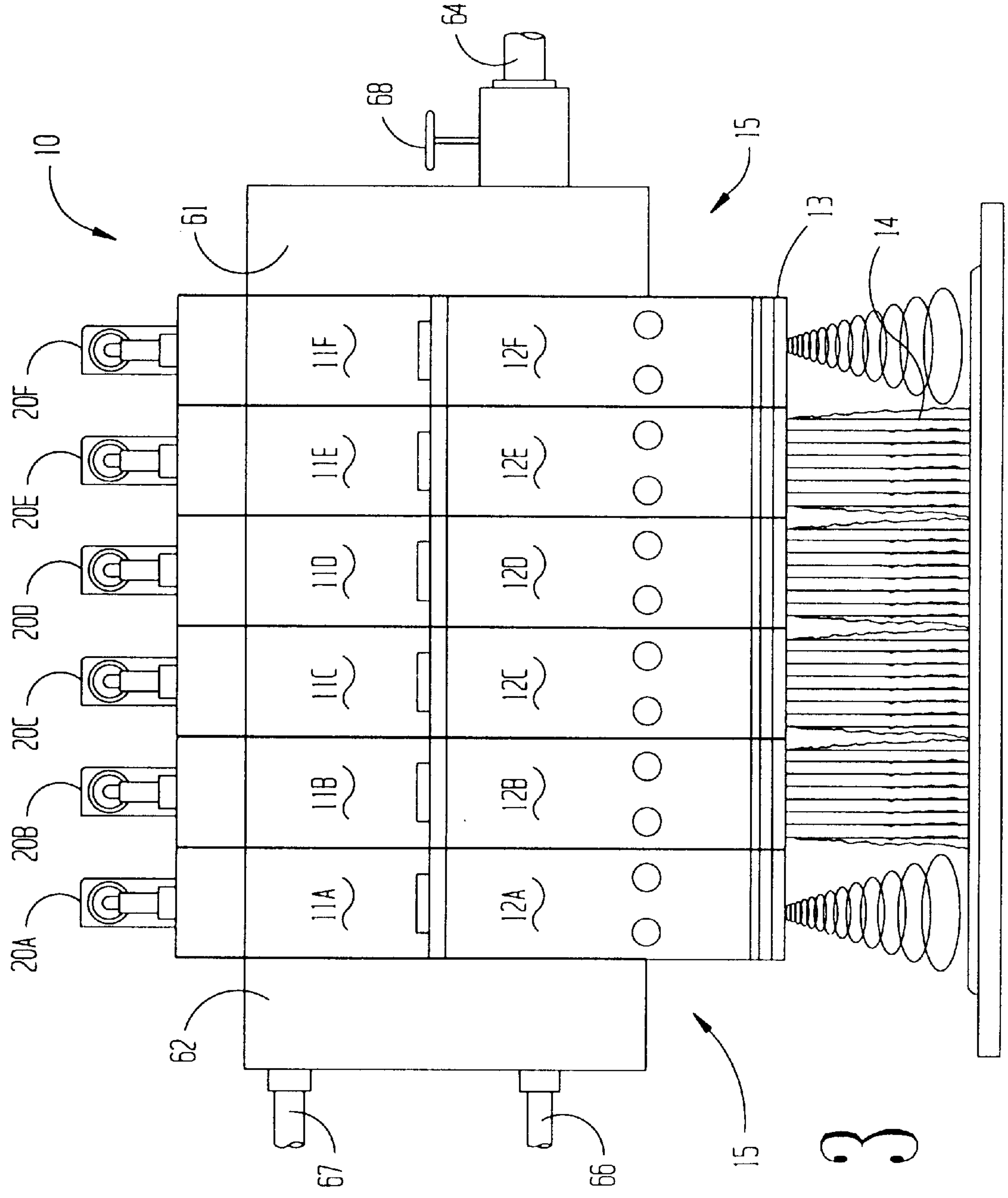
FIG. 3 is a front elevation view of the segmented die illustrating the discharge of filaments onto a substrate.

With reference to FIGS. 1, 2 and 3, the meltblowing die 10 of the present invention comprises a plurality of side-by-side die units 15 comprising manifold segments 11 and die modules 12. (In FIGS. 1, 2 and 3, the manifold segments are labeled 11A through 11F and the die modules are labled 12A through 12F for the 6 segment structure.

In FIGS. 4 through 8, the manifold segments are labeled 11, it being understood that all the manifold segments are substantially identical.)

In the embodiment illustrated in FIGS. 1, 2 and 3, each die unit 15 comprises a manifold segment 11, a die module 12 mounted thereon, and a valve actuator 20 for controlling the flow of polymer melt through the die segment. As shown in FIG. 3, each die module 12, has a die tip 13 which discharges filaments 14 onto a moving substrate (or collector) forming a layer or pattern of filaments on the substrate in a somewhat random fashion.

Each of the main components, manifold segment, die module, and controls is described in detail below.

Die Modules

The preferred die modules 12 are the type described in U.S. Pat. Nos. 5,618,566 and 5,728,219, the disclosures of which are incorporated herein by reference. It should be understood, however, that other die modules may be used. See, for example, U.S. patent application Ser. No. 09/021, 426, filed Feb. 10, 1998, entitled "MODULAR DIE WITH QUICK CHANGE DIE TIP OR NOZZLE."

Figure 4:
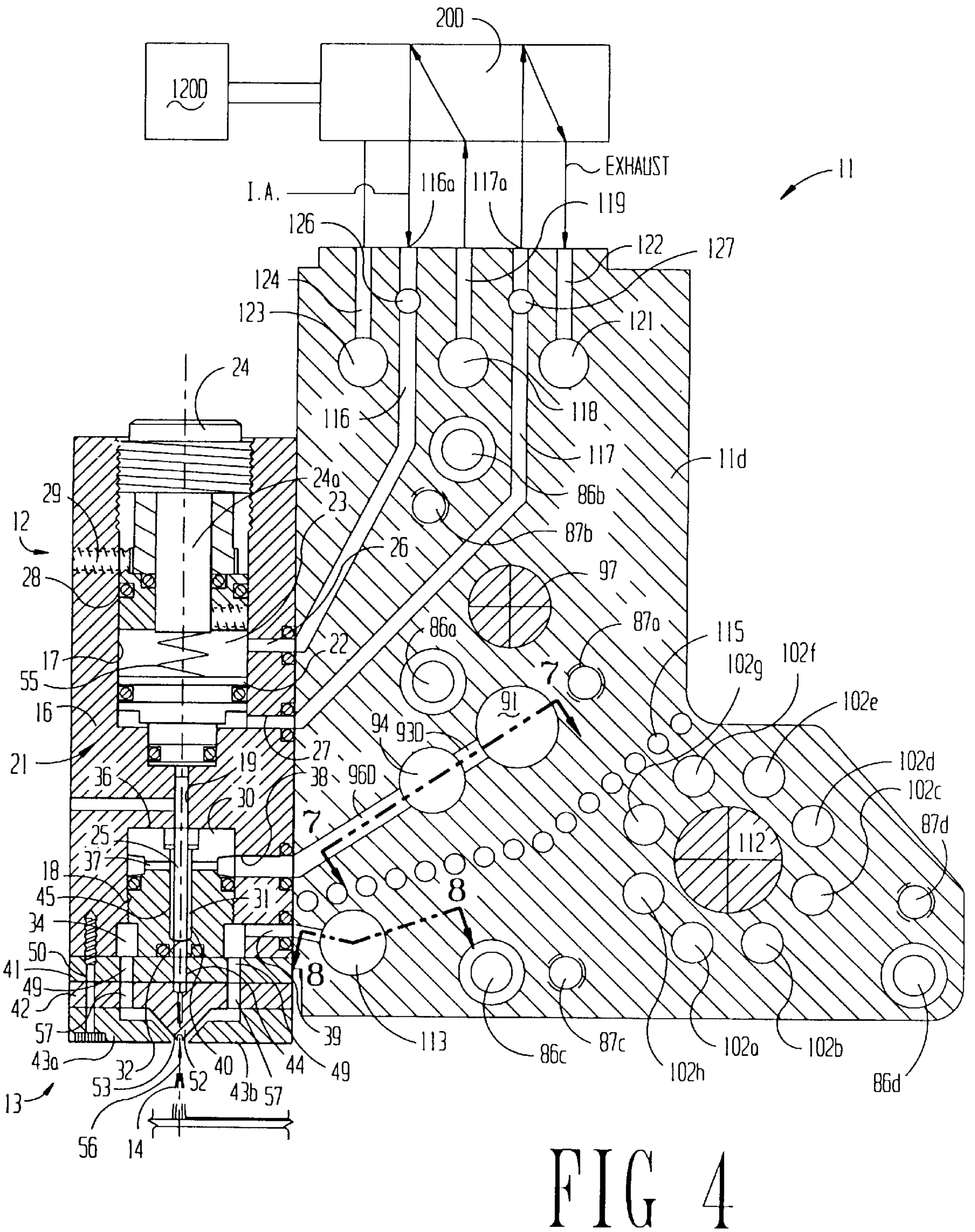
FIG. 4 is an enlarged sectional view taken along plane 4—4 of FIG. 1 illustrating a middle section of the segmented manifold.
Figure 5:
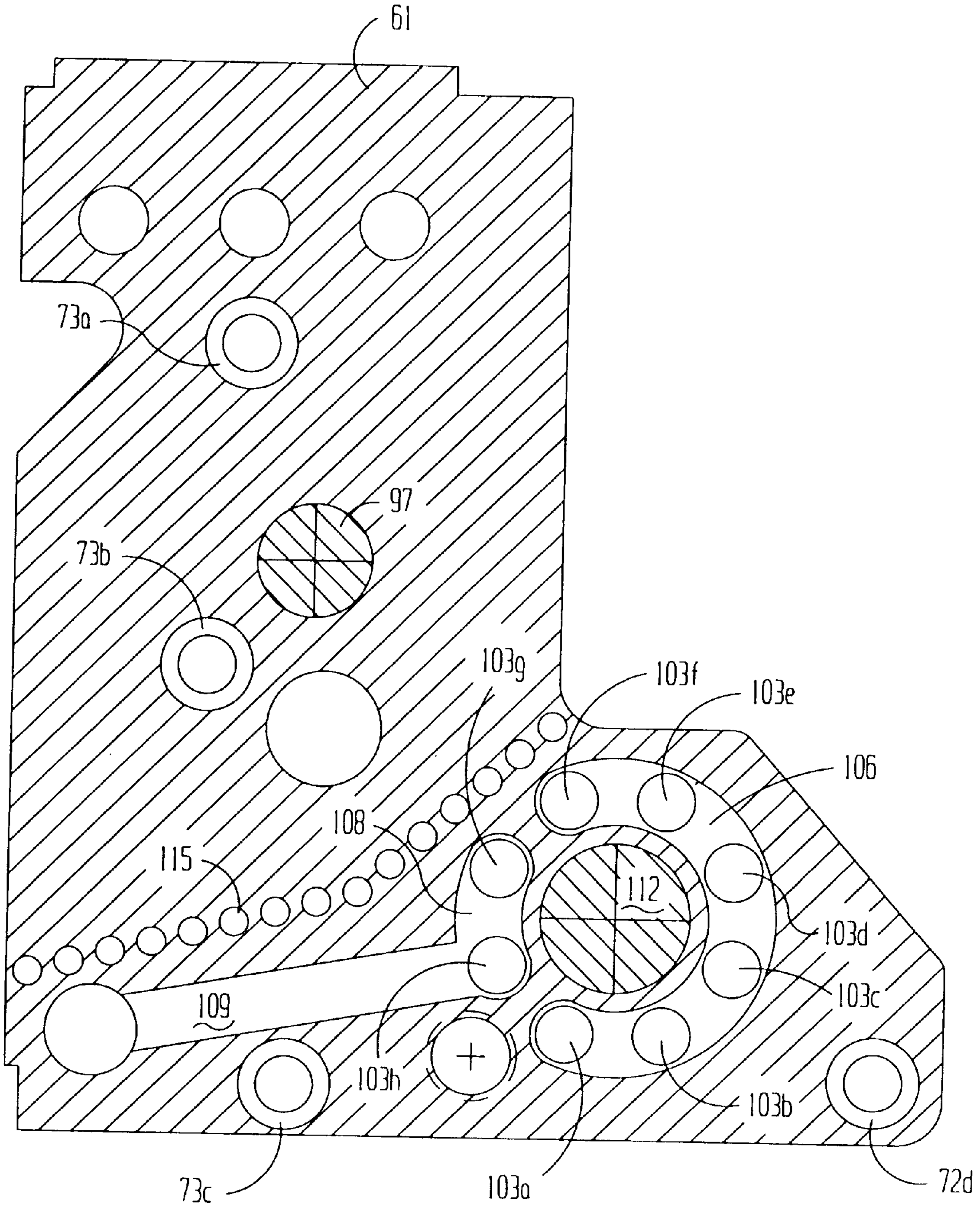
FIG. 5 is a sectional view taken along cutting plane 5—5 of FIG. 1 illustrating an end plate of the segmented manifold.
Figure 6:
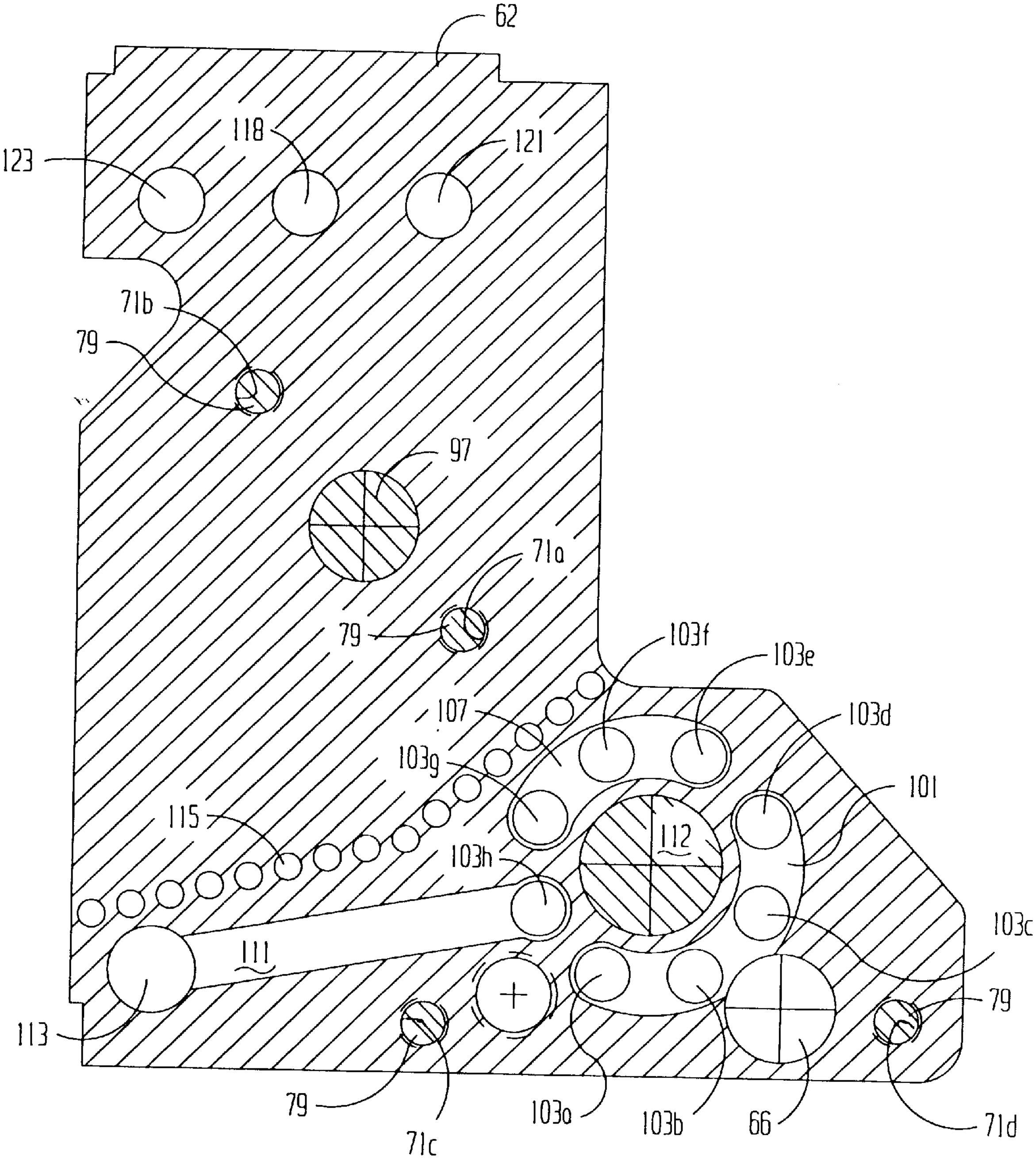
FIG. 6 is a sectional view taken along cutting plane 6—6 of FIG. 1 illustrating the end plate of the segmented manifold opposite that shown in FIG. 5.

As best seen in FIG. 4, each die module 12 consists of a die body 16 and a die tip 13. The die body 16 has formed therein an upper circular recess 17 and a lower circular recess 18 which are interconnected by a narrow opening 19. The upper recess 17 defines a cylindrical chamber 23 which is closed at its top by threaded plug 24. Valve assembly 21 mounted within chamber 23 comprises piston 22 having depending therefrom stem 25. The piston 22 is reciprocally movable within chamber 23, with adjustment pin **24*a* limiting the upward movement. Conventional o-rings may be used at the interface of the various surfaces for fluid seals as illustrated at 28**.

Side ports 26 and 27 are formed in the wall of the die body 16 to provide communication to chamber 23 above and below piston 22, respectively. As described in more detail below, the ports 26 and 27 serve to conduct air (referred to as instrument gas or air) to and from each side of piston 22.

Mounted in the lower recess 18 is a threaded valve insert member 30 having a central opening 31 extending axially therethrough and terminating in valve port 32 at its lower extremity. The lower portion of insert member 30 is of reduced diameter and in combination with the die body inner wall defined a downwardly facing cavity 34. Upper portion 36 of insert member 30 abuts the top surface of recess 18 and has a plurality (e.g. 4) of circumferential ports 37 formed therein and in fluid communication with the central passage 31. An annular recess extends around the upper portion 36 interconnecting the ports 37.

Valve stem 25 extends through body opening 19 and axial opening 31 of insert member 30, and terminates at end 40 which is adapted to seat on valve port 32. The annular space 45 between stem 25 and opening 31 is sufficient for polymer melt to flow therethrough. End 40 of stem 25 seats on port 32 with piston 22 in its lower position within chamber 23 as illustrated in FIG. 4. As discussed below, actuation of the valve assembly 21 moves stem end 40 away from port 32 (open position), permitting the flow of polymer melt therethrough. Melt flows from the manifold 11 through side port 38, through 37, through annular space 45 discharging through port 32 into the die tip assembly 13. Conventional o-rings may be used at the interface of the various surfaces as illustrated in the drawings.

The die tip assembly 13 comprises a stack up of four parts: a transfer plate 41, a die tip 42, and two air plates **43*a* and 43*b*. The assembly 13 can be preassembled and adjusted prior to mounting onto the die body 16 using bolts 50**.

Transfer plate 41 is a thin metal member having a central polymer opening 44 formed therein. Two rows of air holes 49 flank the opening 44 as illustrated in FIG. 4. When mounted on the lower mounting surface of body 16, the transfer plate 41 covers the cavity 34 and therewith defines an air chamber with the air holes 49 providing outlets for air from cavity 34. Opening 44 registers with port 32 with an o-ring between these providing a fluid seal at the interface surrounding port 32. Holes 49 register with air holes 57 formed in die tip 42.

The die tip 42 comprises a base member which is co-extensive with the transfer plate 41 and the mounting surface of die body 16, and a triangular nose piece 52 which may be integrally formed with the base.

The nose piece 52 terminates in apex 56 which has a row of orifices 53 spaced therealong.

Air plates 43*a* and 43*b* are in flanking relationship to the nose piece 52 and define converging air slits which discharge at the apex of nose piece 52. Air (referred to as process air) is directed to opposite sides of the nose piece 52 into the converging slits and discharge therefrom as converging air sheets which meet at the apex of nose piece 52 and contact the filaments 14 emerging from the row of orifices 53.

The module 12 of the type disclosed in FIG. 4 is described in more detail in the above referenced U.S. Pat. No. 5,618,566. Also useable in the present invention are modules disclosed in U.S. Pat. No. 5,728,219 and U.S. patent application Ser. Nos. 08/820,559 and 09/021,426. Other types of modules may also be used. The modules may dispense meltblown fibers, spirals, beads, sprays, or polymer coatings from the nozzle. Thus the module may be provided with a variety of nozzles including meltblowing nozzles, spiral spray nozzles, bead nozzles and coating nozzles.

Manifold

As seen in FIGS. 1–3, segmented manifold 11 comprises end plates 61 and 62 having sandwiched therebetween a plurality of middle section 11A–F. End plates 61 and 62 are designed to provide fluid seals at each end of the die as well as provide inlet ports for a polymer melt at 64 and an inlet for process air at 66. Inlet 64 may have removable filter cartridge 68 for removing impurities from the melt stream. As described in detail below air inlet 67 in plate 62 provides air, referred to as instrument air for operating control valves 20A–F in die modules 12A–F, respectively.

As seen in FIGS. 1, 2, 5 and 6, end plate 62 has threaded bolt holes 71*a*–*d* which align with countersunk bolt holes 72*a*–*d* in middle plate 11A (only 72*a* and *b* shown in FIGS. 1 and 2, respectively). End plate 61 has countersunk holes 73*a*–*d* which align with thread holes 74*a*–*d* (only 74*a, b* shown) in middle plate 11F. Countersunk bolts 79 thus join plate 62 to plate 11A leaving surface 81 flush for adjoining middle plate 11B to 11A, and flush surface 82 for joining end plate 61 to middle plate 11F.

Adjacent middle sections 11A–F are joined by bolts 85 arranged in an alternating pattern of threaded and countersunk bolt holes. As seen in FIG. 4, middle section 11D has four bored and countersunk bolt holes 86*a*–*d* and four threaded bolt holes 87*a*–*d.* Plates 11C and 11E flank 11D and have bolt holes which align with holes 86*a*–*d* and 87*a*–*d,* however, the pattern of countersunk holes and threaded holes are interchanged in the flanking plates. Thus countersunk bored holes 86*a*–*d* in plate 11D will align with threaded holes in plate 11C, and threaded holes 87*a*–*d* will align with bored and countersunk holes in plate 11E (see FIGS. 1 and 2). This design of interchanging the pattern of countersunk holes and threaded holes in adjacent plates is repeated over the length of the die. Countersunk holes 86*a*–*d* are of sufficient depth so that the heads of bolts 85 do not protrude beyond the outer lateral surface of the middle sections and thus permits the abutting surfaces of adjacent sections to be flush when bolts 85 are tightened. Tightening of bolts 85 establishes a metal-on-metal fluid seal between adjacent plates. O-rings may also be used to seal adjacent plates.

Polymer Flow

Figure 7:
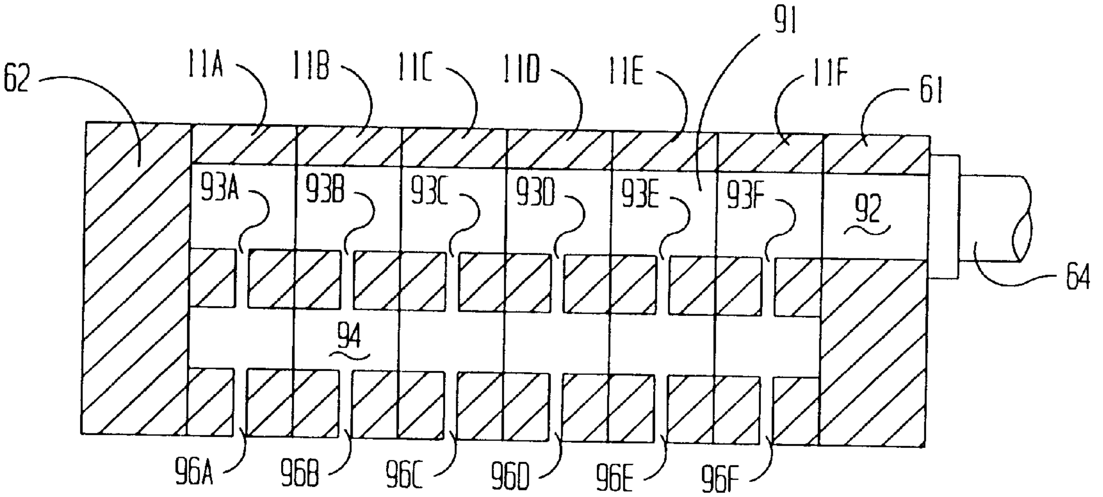
FIG. 7 is a sectional view of the segmented manifold taken along plane 7—7 of FIG. 4 illustrating the polymer flow passages.

Referring to FIGS. 1, 4 and 7, middle sections 11A–F have central polymer flow passage 91 (see FIG. 4) which, when bolted together define continuous flow passage 92 which extends the length of the die. Polymer passage 92 interconnects manifold segments 11A–F. A polymer melt enters the die through inlet 64 and flows into passage 92. Each middle plate has a hole 93A–F (see FIG. 7) which leads from passage 92 into second continuous passage 94 and holes 96A–F which is the outlet of the manifold and feeds polymer to die modules 12A–F in parallel. The outlet of passages 96A–F register with the polymer inlet 38 (see FIG. 4) of each die module. The lateral surfaces of middle plates 11A–F and end plates 61 and 62 are precisely machined whereby a fluid seal is established at the interfaces when the plates are bolted together by bolts 85 as has been described.

Polymer melt thus enters the die through plate 61 at 64, fills passage 92, flows in parallel through holes 93A–F, fills continuous passage 94, flows in parallel through holes 96A–F, and enters die modules 12A–F through passages 38 (see FIG. 4). The polymer which enters the die modules is extruded to form filaments 14 as has been described. The polymer manifold design wherein the polymer flows between the two continuous passages 92 and 94 via a plurality of parallel holes serves to equalize the flow over the die length. Heating element 97 maintains the polymer at the proper operating temperature.

Process Air

Referring to FIGS. 2, 4, 5 and 6. Heated process air enters through inlet 66 which registers with circular groove 101 (FIG. 6) formed along the inner wall of end plate 62. Middle sections 11A–F have a plurality of holes 102*a*–*d* which define continuous flow passages 103*a*–*d* which travel the length of the die as seen in FIG. 2 (103*c, d* shown only). Air passages 103*a*–*d* interconnect manifold segments 11A–F. The inlets of passages 103*a*–*d* register with groove 101 so that air entering the groove will flow the length of the die from plate 62 to plate 61. The outlets of passages 103*a*–*d* register with groove 106 in plate 61 passages which turns the air and feeds the air passages 103*e, f* whereby the air flows back along the length of the die in the direction opposite that a passages 103*a*–*d.* The outlets to passages 103*e, f* register with groove 107 formed in plate 62 which receives the air and turns the air to travel back along the length of the die through passage 103*g* which discharges into groove 108 of end plate 61. Groove 108 feeds passage 103*h* and a portion of the air travels back along the die length through passage 103*h* while the rest of the air flows towards the manifold discharge through slot 109 in plate 61. Air which returns to plate 62 via 103*h* flows towards the manifold discharge through slot 111. Thus the air makes three or four passes along the length of the die before being discharge to the die modules. Central heating element 112 heats the multi-pass air to the operating temperature. Arrows 128 in FIG. 2 indicate the direction of air flow. Because the process air temperature is hotter than the polymer operating temperature a plurality of isolation holes 115 are provided in plates 61, 62 and 11A–F to disrupt heat flow between the process air flow and polymer flow passages of the manifold.

Figure 8:
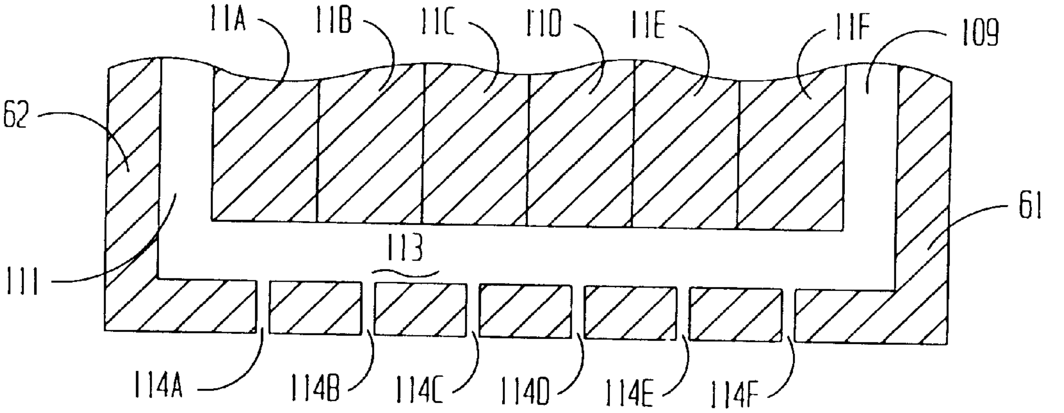
FIG. 8 is a sectional view of the segmented manifold taken along section 8—8 of FIG. 4 illustrating the process air flow passages.

As seen in FIGS. 2 and 8, process air flows towards the manifold discharge along both sides of the manifold through slots 109 and 111. Plates 11A–F have holes which define air passage 113 which extends the length of the die. Slots 109 and 111 discharge from opposite sides into passage 113 which feeds in parallel holes 114A–F which in turn feed associated air input 39 in die modules 12A–F. The air flows through the die modules as has been described and is discharged as converging sheets of air onto fibers 14 extruded at die tip apex 56.

Instrument Air

Each die module comprises a valve assembly 21 which is actuated by compressed air acting above or below piston 22. Instrument air is supplied to the top and bottom air chambers on each side of valve piston 22 (see FIG. 4) by flow lines 116 and 117, respectively, formed in each middle plate 11A–F. Three way solenoid valve 20D with electronic controller 120D controls the flow of instrument air. Instrument air inlet 118 is a continuous flow passage over the length of the die. Passage 119 in each plate delivers the air in parallel to each of solenoid valves 20A–F (shown schematically in FIG. 4). The valve delivers the air to either passage 116 or 117 depending on whether the valve 21 is to be opened or closed. As illustrated in FIG. 4, pressurized instrument air is delivered via line 116 to the top of the piston 22 which acts to force the piston downward, while the controller 20D simultaneously opens the air chamber below the piston to exhaust port 121 via lines 117 and 122. In the downward position, valve stem 25 seats on port 32 thereby closing the polymer flow passage to the die tip. In the open position, solenoid 20D would deliver pressurized air to the under side of piston 22 through line 117 and would simultaneously open the upper side of the piston to exhaust port 123 via line 124. The pressure beneath the piston forces the piston upward and unseats valve stem 25 to open the polymer flow passage to the die tip. Thus in the preferred mode each die module 12 has a separate solenoid valve such that the polymer flow can be controlled through each die module independently. In this mode side holes 126 and 127 which intersect passages 116 and 117, respectively, are plugged.

In a second preferred embodiment a single solenoid valve may be used to activate valves 21 in a plurality of adjacent die modules. In this configuration the tops of holes 116 and 117 (labeled 116*a* and 117*a*) are plugged and side holes 126 and 127 opened. Side holes 126 and 127 are continuous holes and will intersect each of the flow lines 116 and 117 to be controlled. Thus in the closed position, pressurized air would be delivered to all of the die modules simultaneously through hole 126 while hole 127 would be opened to the exhaust. The instrument air flow is reversed to open the valve.

Assembly and Operation

As indicated above, the modular die assembly 10 of the present invention can be tailored to meet the needs of a particular operation. As exemplified in FIGS. 1, 2 and 3, six die segments 11A–F, each about 0.75 inches in width are used in the assembly 10. The manifold segments 11 are bolted together as described previously, and the heater elements 97, 112 installed. The length of the heater elements 97, 112 will be selected based on the number of segments 11 employed and will extend through most segments. The die modules 12 may be mounted on each manifold segment 11 before or after interconnecting the segments 11, and may include any of the nozzles 13 previously described. FIG. 3 illustrates four modules 12*b–e* with meltblowing die tips and two end modules 12*a*, 12*f* with spiral nozzles.

A particularly advantageous feature of the present invention is that it permits (a) the construction of a meltblowing die with a wide range of possible lengths, interchangeable manifold segments, and self contained modules, and (b) variation of die nozzles (e.g. meltblowing, spiral, or bead applicators) to achieve a predetermined and varied pattern. Variable die length and adhesive patterns may be important for applying adhesives to substrates of different sizes from one application to another. The following sizes and numbers are illustrative of the versatility of the modular die construction of the present invention.

| Die Assembly | Broad Range | Preferred Range | Best Mode |
|---|---|---|---|
| Number of Units (15) | 2–1,000 | 2–100 | 5–50 |
| Length of each Unit (15) (inches) | 0.25–1.50" | 0.5–1.00" | 0.5–0.8" |
| Orifice (53) Diameter (inches) | 0.005–0.050" | 0.01–0.040" | 0.015–0.030" |
| Orifices/Inch* | 5–50 | 10–40 | 10–30 |
| Different Types of Nozzles (13) | 2–4 | 2–3 | 2 |

*filaments per inch per slot.

The lines, instruments, and controls are connected and operation commenced. A hot melt adhesive is delivered to the die 10 through line 64, process air is delivered to the die through line 66, and instrument air or gas is delivered through line 67.

Actuation of the control valves 21 opens port 32 of each module 12 as described previously, causing polymer melt to flow through each die module 12. In the meltblowing modules 15, the melt flows through manifold passages 91, 93, 94, 96, through side ports 38, through passages 37 and annular space 45, and through port 32 into the die tip assembly 13. The polymer melt is distributed laterally in the die tip 13 and discharges through orifices 53 as side-by-side filaments 14. Multi-pass process air meanwhile flows through manifold passages 103 where it is heated, into slots 109 and 111, through air passage 113 and is delivered to modules 20A–F through ports 114A–F, respectively. Air enters each module 12 through port 39 and flows through holes 49 and 57 and into slits discharging as converging air sheets at or near the die tip apex of the nose piece 52. The converging air sheets contact the filaments 14 discharging from the orifices 53 and by drag forces stretch them and deposit them onto the underlying substrate in a random pattern. This forms a generally uniform deposit of meltblown material on the substrate.

In each of the flanking spiral nozzle modules 12, the polymer and air flows are basically the same, with the difference being the nozzle tip. In the spiral nozzle, a monofilament is extruded and air jets are directed to impart a swirl on the monofilament. The swirling action draws down the monofilament and deposits it as overlapping swirls on the substrate as described in the above referenced U.S. Pat. No. 5,728,219.

Typical operational parameters are as follows:

| Polymer | Hot melt adhesive |
|---|---|
| Temperature of the Die and Polymer | 280° F. to 325° F. |
| Temperature of Air | 280° F. to 325° F. |
| Polymer Flow Rate | 0.1 to 10 grms/hole/min. |
| Hot air Flow Rate | 0.1 to 2 SCFM/inch |
| Deposition | 0.05 to 500 g/m$^2$ |

As indicated above, the die assembly 10 may be used in meltblowing any polymeric material, but meltblowing adhesives is the preferred polymer. The adhesives include EVA's (e.g. 20–40 wt % EVA). These polymers generally have lower viscosities than those used in meltblown webs. Conventional hot melt adhesives useable include those disclosed in U.S. Pat. Nos. 4,497,941, 4,325,853, and 4,315,842, the disclosures of which are incorporated herein by reference. The preferred hot melt adhesives include SIS and SBS block copolymer based adhesives. These adhesives contain block copolymer, tackifier, and oil in various ratios. The above melt adhesives are by way of illustration only; other melt adhesives may also be used.

Although the present invention has been described with reference to meltblowing hot melt adhesive, it is to be understood that the invention may also be used to meltblow polymer in the manufacture of webs. The dimensions of the die tip may have a small difference in certain features as described in the above referenced U.S. Pat. Nos. 5,145,689 and 5,618,566.

The typical meltblowing web forming resins include a wide range of polyolefins such as propylene and ethylene homopolymers and copolymers. Specific thermoplastics include ethylene acrylic copolymers, nylon, polyamides, polyesters, polystyrene, poly(methyl methacrylate), polytrifluoro-chloroethylene, polyurethanes, polycarboneates, silicone sulfide, and poly(ethylene terephthalate), pitch, and blends of the above. The preferred resin is polypropylene. The above list is not intended to be limiting, as new and improved meltblowing thermoplastic resins continue to be developed.

The invention may also be used with advantage in coating substrates or objects with thermoplastics.

The thermoplastic polymer, hot melt adhesives or those used in meltblowing webs, may be delivered to the die by a variety of well known means including extruders metering pumps and the like.

What is claimed is:

1. A segmented die assembly, comprising:

(a) a plurality of manifold segments, each manifold segment having a polymer flow passage and an air flow passage formed therein; said manifold segments being interconnected in side-by-side relationship wherein said air passages and polymer passages are in fluid communication, respectively;

(b) a die module mounted on each manifold segment, said die module comprising a die body having a polymer flow passage and an air flow passage in fluid communication with said polymer flow passage and said air flow passage of its associated manifold segment, respectively; and a die tip or nozzle mounted on said die body and having a polymer flow passage in fluid communication with said polymer flow passage of its associated die body for receiving the polymer melt and discharging a filament or filaments therefrom;

(c) means for delivering a polymer melt to at least one manifold segment whereby the melt is distributed through said other interconnected manifold segments and flows through each die module discharging as a filament or filaments from each die tip or nozzle; and (d) means for delivering air to at least one manifold segment whereby air is distributed in said interconnected manifold segments and flows through each die module discharging through said die tip or nozzle.

2. The die assembly of claim 1 wherein said die tip or nozzle is selected from the group consisting of meltblowing die tip, spiral spray nozzle, spray nozzle, bead nozzle, and coating nozzle.

3. The die assembly of claim 2 wherein said die tip on at least one module is a meltblowing die tip.

4. The die assembly of claim 1 wherein said die tip on each die module is air assisted having air passages formed therein, said air passages of said die tip being in fluid communication with said air flow passages of said die body on which it is mounted.

5. The die assembly of claim 1 wherein each die module has an air actuated valve mounted therein to open and close said polymer flow passage therein and each manifold segment having instrument air flow passages formed therein for delivering air to and from said air actuated valve, said assembly further comprising control means for selectively delivering air to and from said instrument air passages of said manifold segment.

6. The die assembly of claim 1 wherein said manifold segments are identical.

7. The die assembly of claim 1 wherein said assembly comprises from 2 to 100 die segments.

8. The die assembly of claim 1 wherein each manifold segment and said die module mounted thereon is from 0.25 to 1.5 inches in width.

9. The die assembly of claim 1 wherein each manifold segment includes electric heaters for heating said polymer and said air and wherein said air flow passage of a particular manifold segment is in fluid communication with said air passages of said other manifold segments whereby air flows through each manifold segment before flowing to said die module mounted on said particular manifold segment.

10. A meltblowing die comprising:

(a) a manifold with at least two manifold segments, each segment having a polymer flow passage and an air flow passage, said polymer flow passages and air flow passages being interconnected, respectively;

(b) a die module secured to each manifold segment, each die module having a polymer flow passage which registers with its associated manifold segment polymer flow passage, an air flow passage which registers with its associated manifold segment air flow passage, a die tip or nozzle for discharging polymer as a filament or filaments, and an air flow discharge for delivering air onto said filament or filaments;

(c) means for delivering a polymer melt to at least one of said manifold segments whereby said melt flows through said interconnected polymer flow passages of each manifold segment and is delivered to said associated die modules; and (d) means for delivering air to at least one of said interconnected manifold segments whereby said air flows through each manifold segment and is delivered to said associated die modules.

11. The meltblowing die of claim 10 further comprising valve means for selectively controlling the flow of polymer melt through each die module independently.

12. A segmented die assembly comprising a plurality of separate air-assisted die units interconnected in side-by-side relationship, each die unit comprising:

a) a manifold segment having formed therein (i) a process air flow passage, (ii) a polymer flow passage, and (iii) an instrument air flow passage, said process air flow passages and said polymer flow passages respectively being in fluid communication;

b) a die module having a die body detachably mounted on said manifold segment, and an air-assisted die tip or nozzle mounted on said die body, said die body having formed therein (i) a process air flow passage, (ii) a polymer flow passage and (iii) an instrument air flow passage which, respectively, are in fluid communication with said process air flow passage, said polymer flow passage, and said instrument air flow passage of said manifold segment, said die body further having an air-actuated valve mounted therein for opening and closing said polymer flow passage thereof, which is in fluid communication with said instrument air flow passage thereof;

said die tip having (i) a process air flow passage and (ii) a polymer flow passage which, respectively, are in fluid communication with said process air flow passage and said polymer flow passage of said die body; and c) means for selectively delivering air to and from said instrument air flow passages of said manifold segment for actuating said air-actuated valve.

13. The segmented die assembly of claim 12 wherein said die assembly comprises from 5 to 50 die units.

* * * * *